United States Patent
Wada

(10) Patent No.: US 10,161,538 B2
(45) Date of Patent: Dec. 25, 2018

(54) VALVE DEVICE

(71) Applicant: NIFCO INC., Yokosuka-shi, Kanagawa (JP)

(72) Inventor: Toshio Wada, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 108 days.

(21) Appl. No.: 15/118,237

(22) PCT Filed: Feb. 10, 2015

(86) PCT No.: PCT/JP2015/053637
§ 371 (c)(1),
(2) Date: Aug. 11, 2016

(87) PCT Pub. No.: WO2015/122408
PCT Pub. Date: Aug. 20, 2015

(65) Prior Publication Data
US 2017/0175912 A1    Jun. 22, 2017

(30) Foreign Application Priority Data

Feb. 12, 2014  (JP) .................................. 2014-024393

(51) Int. Cl.
*F16K 24/04*   (2006.01)
*F02M 21/02*   (2006.01)
(Continued)

(52) U.S. Cl.
CPC ...... *F16K 24/044* (2013.01); *B60K 15/03519* (2013.01); *F02M 21/0242* (2013.01);
(Continued)

(58) Field of Classification Search
CPC ............ F16K 24/044; B60K 15/03519; B60K 2015/03557; F02M 25/0836
(Continued)

(56) References Cited

U.S. PATENT DOCUMENTS

| 4,886,089 A | 12/1989 | Gabrlik et al. |
| 5,313,977 A | 5/1994 | Bergsma et al. |
| 5,850,851 A * | 12/1998 | Miura ................ F16K 15/08 137/540 |
| 5,950,659 A * | 9/1999 | Szlaga ................ F16K 24/048 137/202 |

(Continued)

FOREIGN PATENT DOCUMENTS

WO    2014/011229 A1    1/2014

OTHER PUBLICATIONS

PCT International Search Report of PCT/JP2015/053637, Completed on May 7, 2015, dated May 19, 2015.
Europe Patent Office, "Search Report for European Patent Application No. 15749543.3," dated Nov. 20, 2017.

*Primary Examiner* — Matthew W Jellett
*Assistant Examiner* — Christopher Ballman
(74) *Attorney, Agent, or Firm* — Manabu Kanesaka

(57) ABSTRACT

A valve device includes a float body and a valve body provided in an upper portion of the float body to obliquely move. The valve body includes a seal portion that closes a valve opening formed in a case when the float rises, an engaging portion serving as a linkage portion with respect to the float body, and an abutting portion that abuts on a vicinity of the valve opening when inclining obliquely. An area of the abutting portion in the horizontal direction is made smaller than that of the seal portion such that the abutting portion laterally protrudes from the seal portion.

1 Claim, 11 Drawing Sheets

(51) Int. Cl.
 *B60K 15/035* (2006.01)
 *F02M 25/08* (2006.01)
 *B60K 15/03* (2006.01)

(52) U.S. Cl.
 CPC ............ *F02M 25/0836* (2013.01); *B60K 2015/03289* (2013.01); *B60K 2015/03557* (2013.01); *B60K 2015/03576* (2013.01); *Y02T 10/32* (2013.01)

(58) Field of Classification Search
 USPC ............ 137/409, 202, 43, 199, 198, 197
 See application file for complete search history.

(56) References Cited

U.S. PATENT DOCUMENTS

| | | | | |
|---|---|---|---|---|
| 5,960,817 | A * | 10/1999 | Johansen | B60K 15/03519 137/202 |
| 5,988,201 | A | 11/1999 | Lebkuchner et al. | |
| 6,371,152 | B1 * | 4/2002 | Benjey | B60K 15/03519 137/202 |
| 7,543,597 | B2 | 6/2009 | Leonhardt | |
| 7,819,129 | B2 * | 10/2010 | Keefer | F16K 17/14 137/202 |
| 2008/0110503 | A1 | 5/2008 | Park | |
| 2010/0089466 | A1 * | 4/2010 | Kobayashi | B60K 15/03519 137/409 |
| 2015/0107689 | A1 | 4/2015 | Walkowski | |

\* cited by examiner

VALVE DEVICE

RELATED APPLICATIONS

The present application is National Phase of International Application No. PCT/JP2015/053637 filed Feb. 10, 2015, and claims priority from Japanese Application No. 2014-024393, filed Feb. 12, 2014, the disclosure of which is hereby incorporated by reference herein in its entirety.

TECHNICAL FIELD

The present invention relates to an improvement in a valve device which is mounted to a fuel tank of a vehicle or a two-wheeled vehicle and functions to communicate the inside and the outside of the fuel tank in an open state.

BACKGROUND ART

Patent Literature 1 discloses a valve device forming a ventilation passage of a fuel tank, which is provided with a float that rises when fuel flows into a case to close a valve opening communicating with the passage to the outside of the tank.

In the valve device provided with such a type of float, when the fuel flows out of the case containing the float in the closed state, the float is able to fall down and transitions to an open state. However, in a case where a pressure difference between in and out of the fuel tank is large, the upper portion of the float may be attached to the valve opening. Therefore, the transition to the open state may not be performed smoothly.

In the technique of Patent Literature 1, the valve opening is closed by a plate-shaped valve body which is provided to obliquely move in the upper portion of the float body. Therefore, in the technique of Patent Literature 1, a close contact between the valve body and the valve opening can be released from the lower side of the obliquely-moving valve body. Even in a case where a pressure difference between in and out of the fuel tank is large, the transition to the open state can be smoothly made.

When the transition to such an open state is made, it is desirable that the air in the tank smoothly flows out of the tank. However, in the technique of Patent Literature 1, the valve body is formed in a simple plate shape in which the width is larger than that of the valve opening, and the gas outflow from the tank immediately after the valve is opened is restrictively performed through a gap between the valve body and the valve opening.

CITATION LIST

Patent Literature

Patent Literature 1: U.S. Pat. No. 4,886,089

SUMMARY OF INVENTION

Technical Problem

A main problem to be solved by the present invention is to smoothly transition the valve device employing such a type of float from the closed state to the open state, and to response well to a request for a large amount of gas outflow from the tank to the outside at the same time when the valve is opened.

Solution to Problem

To solve the above problem, according to a first aspect of the present invention, there is provided a valve device that forms a part of a ventilation passage of a fuel tank. The valve device includes a float; and a case that stores the float, wherein the float is provided with a float body and a valve body provided in an upper portion of the float body to obliquely move, the valve body includes a seal portion that closes a valve opening formed in the case when the float rises, a linkage portion with respect to the float body, and an abutting portion that abuts on a vicinity of the valve opening when inclining obliquely, and the abutting portion is formed such that an area in a horizontal direction is smaller than that of the seal portion and laterally protrudes from the seal portion.

Further, to solve the above problem, according to a second aspect of the present invention, there is provided a valve device that forms a part of a ventilation passage of a fuel tank. The valve device includes a float; and a case that stores the float, wherein the float is provided with a float body and a valve body provided in an upper portion of the float body to obliquely move, the valve body includes a seal portion that closes a valve opening formed in the case when the float rises, a linkage portion with respect to the float body, and an abutting portion that is provided on a side opposite to the linkage portion with the seal portion interposed therebetween and abuts on a vicinity of the valve opening when inclining obliquely, and has a length from the linkage portion as one end to the abutting portion as the other end, and a width of the seal portion is larger than that of the valve opening, and a width of the abutting portion is smaller than that of the seal portion.

The valve opening is closed by the seal portion of the valve body of the float which rises when the fuel flows into the case, and the inflow of the fuel toward the upper chamber is inhibited. When the fuel flows out of the case, the float is able to fall down, but the float and the valve body are not linked in the abutting portion. Therefore, the valve body causes the abutting portion to abut on the vicinity of the valve opening, causes the linkage portion to obliquely move down about the contact place, and separates the seal portion from the valve opening. With this configuration, even in a case where the tank is highly pressured, the valve can be smoothly opened. The abutting portion moves toward the center of the valve opening as the float falls down. However, in the invention according to the first point, an area of the abutting portion in the horizontal direction is smaller than that of the seal portion in the horizontal direction. In addition, in the invention according to the second point, the valve body has a length from the linkage portion as one end to the abutting portion as the other end, the width of the seal portion is larger than that of the valve opening, and the width of the abutting portion is smaller than that of the seal portion. Therefore, it is not possible for the abutting portion to hinder the flow of gas as much as possible, which is generated at the same time when the valve is opened, in the tank passing through the valve opening.

According to a preferred aspect of the invention, a ventilation portion is formed in the abutting portion. In addition, according to a preferred aspect of the invention, the ventilation portion is formed as a through hole. In addition, according to a preferred aspect of the invention, the abutting portion is provided on a side opposite to the linkage portion with the seal portion interposed therebetween.

When a recess is formed in the lower portion of the seal portion to contain a projection formed in the upper portion of the float body, the valve body can be stably supported in a state where the seal portion is set horizontal on the float body except when the valve is opened.

In addition, when the valve body is provided with a regulating portion which is hooked on a part of the float body at a predetermined position of oblique movement of the valve body, the oblique movement of the valve body can fall within a constant range, and an unexpected dropout from the float body of the valve body can be inhibited.

Advantageous Effects of Invention

According to the present invention, a large amount of gas outflow can be made from the tank to the outside at the same time when the valve is opened while smoothly transitioning from the closed state to the open state in the valve device employing the float.

DESCRIPTION OF THE EMBODIMENTS

Figure 1:
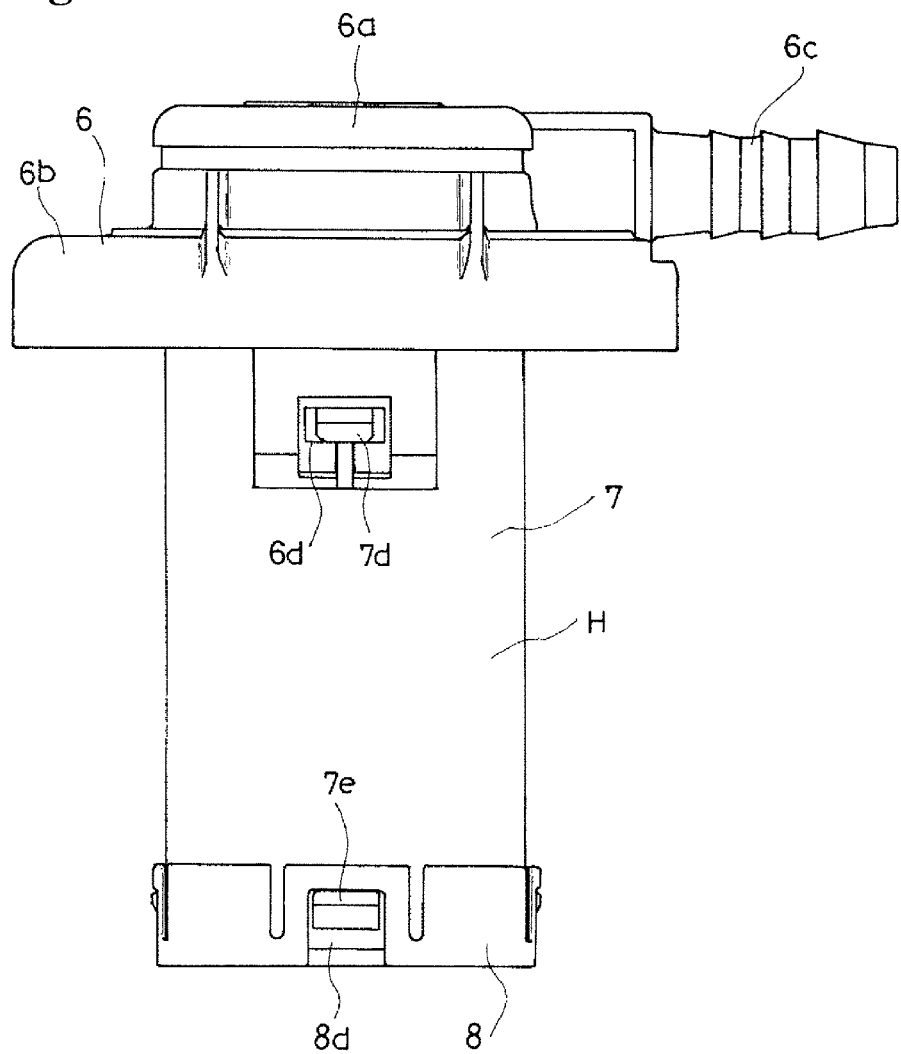
FIG. 1 is a side view of a valve device according to an embodiment of the present invention.
Figure 2:
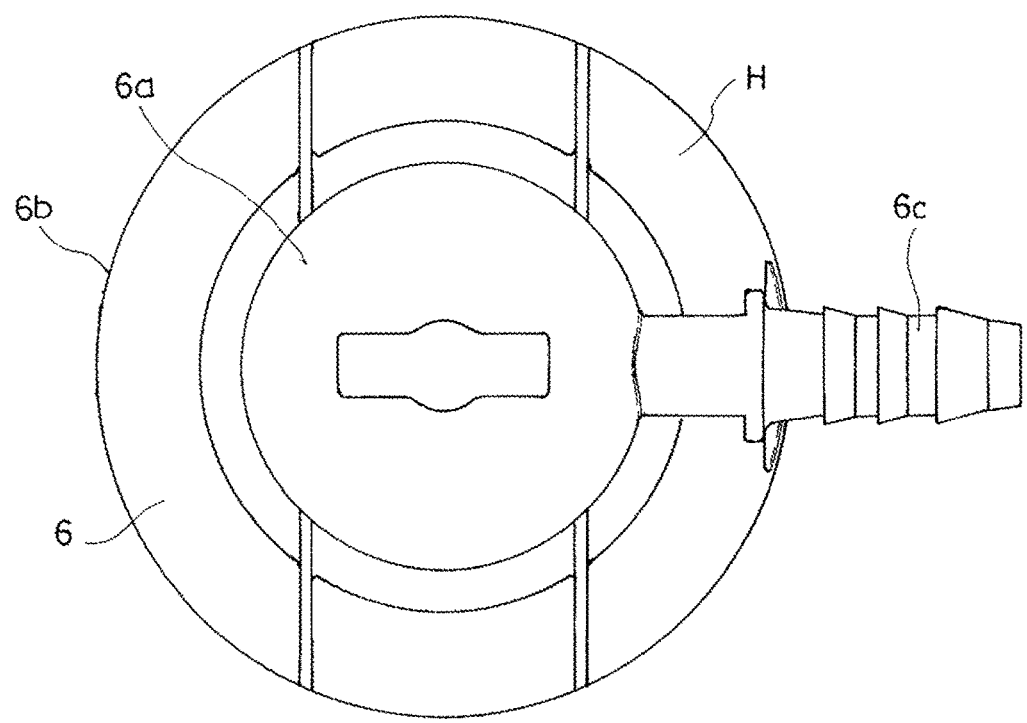
FIG. 2 is a plan view of the valve device.
Figure 3:
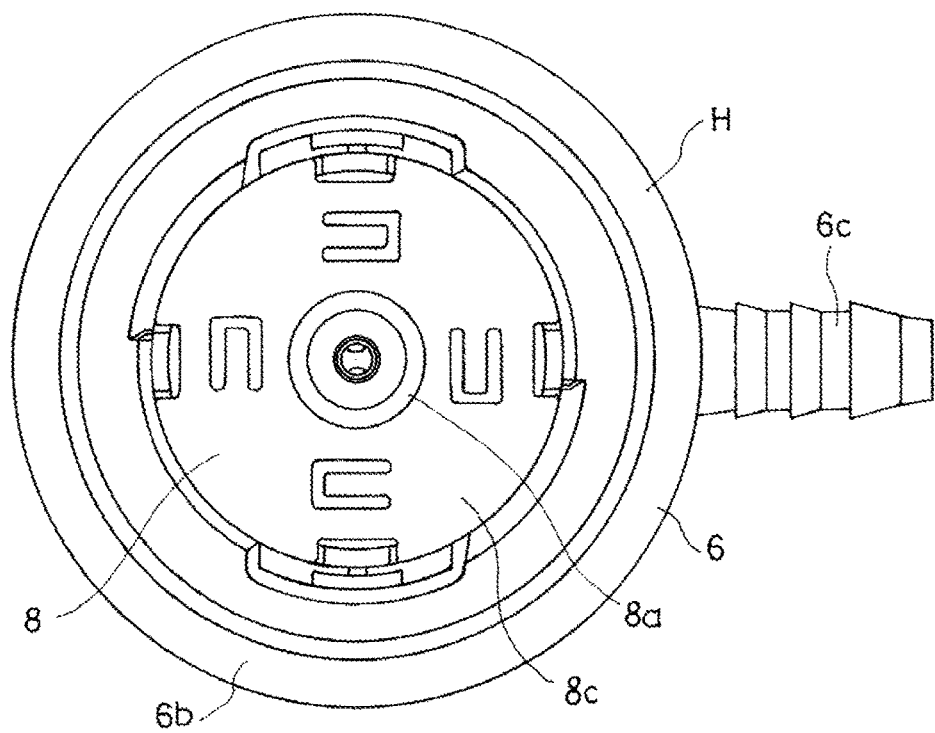
FIG. 3 is a bottom view of the valve device.

Hereinafter, typical embodiments of the present invention will be described with reference to FIGS. 1 to 15. A valve device according to the embodiment is mounted in a fuel tank T of a vehicle or a two-wheeled vehicle and functions to communicate between in and out of the fuel tank T in an open state. The valve device is typically mounted in the upper portion of the fuel tank T and forms apart of a ventilation passage C of the fuel tank T. As the example illustrated in the drawing, the valve device can be installed in the fuel tank T using an attaching hole Tb provided in the fuel tank T or using a bracket (not illustrated) provided in the fuel tank T.

Figure 4:
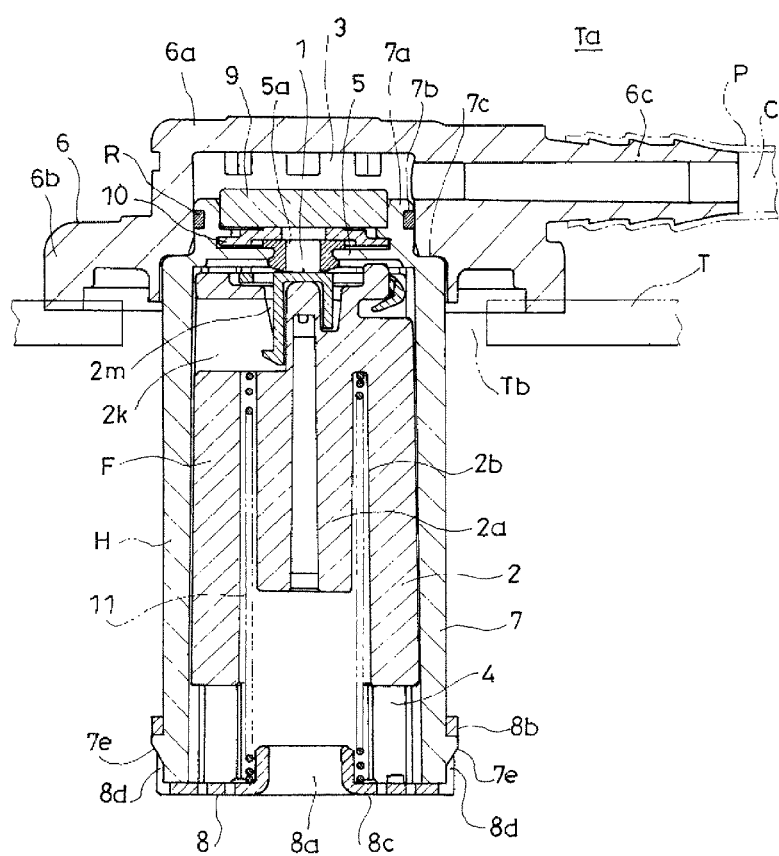
FIG. 4 is a cross-sectional view of the valve device in a closed state.

The valve device includes a float F and a case H containing the float (see FIG. 4). The case H includes a partition wall 5 which separates the case H into an upper chamber 3 and a storage chamber 4 of the float F. The upper chamber 3 is provided above the partition wall 5 and communicates with the outside Ta of the tank through an exhaust port 6c. The storage chamber 4 is provided below the partition wall 5 and contains the float F therein to move up and down. The storage chamber 4 is formed such that fuel flows thereinto from an inlet portion 8a formed in a cap 8 described below which is formed in the bottom portion of the case H. When the float F is at a falling position where the lower end thereof abuts on the bottom portion of the case H (not illustrated), and the inside and the outside of the tank communicate with each other through the inlet portion 8a, a valve opening 5a formed in the partition wall 5, and the exhaust port 6c. When the fuel flows into the storage chamber 4, the rim of the opening 5a facing the storage chamber 4 serves as a valve seat 5b, and the float F raises a valve body 1 provided thereon up to a position to be seated at the valve seat 5b. Therefore, the communication between in and out of the tank is blocked. When the fuel flows out of the storage chamber 4, the float F falls again and the inside and the outside of the tank communicate again through the valve device.

In the example of the drawing, the case H is formed by combining a flange 6, a case body 7, and the cap 8. These components are typically made of plastic.

The case body 7 includes the opening 5a in the upper center, and is formed in a substantially cylinder shape in which the lower end is opened. The upper portion of the case body 7 is formed to be narrow in diameter compared to the other portion, and a circumferential stepped surface 7c is formed on the outside of the upper portion of the case body 7 from a diameter-contracted portion 7a. In addition, a circumferential groove 7b is formed on the outer circumferential portion of the diameter-contracted portion 7a.

More specifically, the diameter-contracted portion 7a is separated from the other place by the partition wall 5. In the example of the drawing, a short cylindrical valve seat constituting body 5d provided with an outer flange 5e at the upper end is fitted from the upper side into a through hole 5c formed at the center of the partition wall 5, so that the valve opening 5a is formed (see FIG. 6). In the example of the drawing, the outer flange 5e abuts on the through hole 5c. The valve seat constituting body 5d protrudes downward from the through hole 5c. The lower end of the valve seat constituting body 5d functions as the valve seat 5b.

The flange 6 has an inner diameter substantially equal to the outer diameter of the diameter-contracted portion 7a of the case body 7 and closes the upper end of the cylinder, and is provided with a short cylinder portion 6a in which the lower end is opened, an outer flange portion 6b which is formed in the lower end of the short cylinder portion 6a, and the exhaust port 6c in which the one end integrally communicates with the side portion of the short cylinder portion 6a to form a cylinder shape extending in the horizontal direction (see FIG. 4).

The diameter-contracted portion 7a of the case body 7 is fitted into the short cylinder portion 6a up to a position where the circumferential stepped surface 7c of the case body 7 abuts on the outer flange portion 6b of the flange 6, so that the case body 7 and the flange 6 are integrated with each other. In a state where the case body 7 and the flange 6 are assembled as described above, a space serving for the upper chamber 3 is formed between the upper portion of the diameter-contracted portion 7a and a closed end of the short cylinder portion 6*a*. Symbol R in FIG. 4 indicates a seal ring which is mounted in the diameter-contracted portion 7*a* using the circumferential groove 7*b*, the diameter-contracted portion 7*a* and the short cylinder portion 6*a* are sealed in an airtight state by the seal ring R. Symbol 7*d* in FIG. 1 indicates an engaging portion formed in the outer side portion of the case body 7. In the example of the drawing, the engaging portion 7*d* is engaged with an engaged portion 6*d* of the flange 6 to keep the assembled state between the case body 7 and the flange 6.

The cap 8 is provided with a short cylinder portion 8*b* which has an inner diameter substantially equal to the outer diameter of the lower end of the case body 7 and a bottom plate 8*c* which closes the lower end of the cylinder of the short cylinder portion 8*b* (see FIG. 4). When the lower end side of the case body 7 is input into the cap 8 after the float F is mounted below the partition wall 5 of the case body 7, an engaging projection 7*e* formed in the case body 7 is engaged with an engaging window 8*d* which is formed in the short cylinder portion 8*b* of the cap 8, the lower end of the case body 7 is closed by the cap 8, and the float F at the falling position is supported by the bottom plate 8*c* of the cap 8. The inlet portion 8*a* is formed in the bottom plate 8*c* of the cap 8.

In the example of the drawing, the valve device is mounted to the fuel tank T by fixing the outer flange portion 6*b* of the flange 6 to the outer surface of the fuel tank T typically with an adhesive in a state where the portion lower than the flange 6 is inserted to the attaching hole Tb opened in the upper portion of the fuel tank T. The exhaust port 6*c* is fitted to one end of a pipe P of the ventilation passage C.

In addition, a circular weight 9 is contained in the diameter-contracted portion 7*a* on the partition wall 5 in the example of the drawing (see FIG. 4). The valve opening 5*a* is normally closed from the upper chamber 3 side by the weight 9. Symbol 10 in FIG. 4 indicates a seat body interposed between the valve seat constituting body 5*d* and the weight 9. An opening to the valve opening 5*a* is formed in the center of the seat body 10. In the example of the drawing, when a pressure difference between in and out of the fuel tank becomes equal to or more than a predetermined value, the weight floats which causes ventilation of the fuel tank to the outside.

Figure 5:
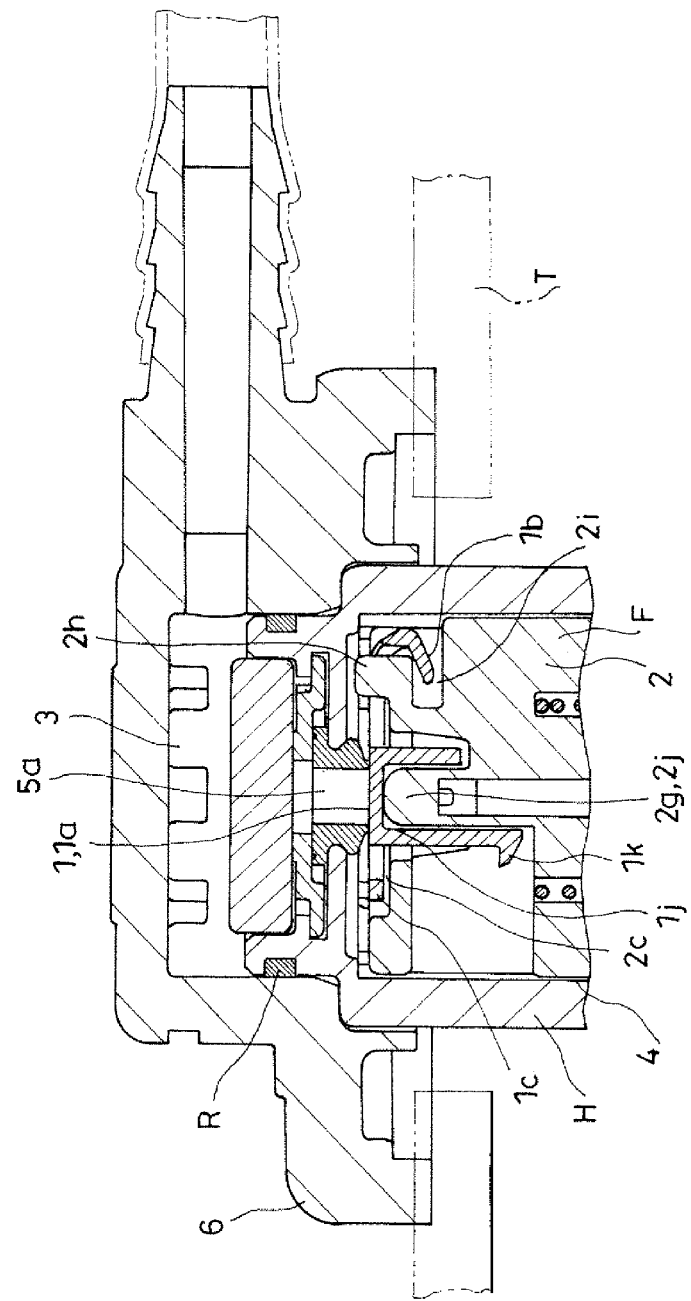
FIG. 5 is a cross-sectional view illustrating main parts of the valve device in the closed state.

The float F is provided with a float body 2 and a valve body 1 which is provided in the upper portion of the float body 2 to obliquely move (see FIG. 5).

In the example of the drawing, the float body 2 substantially closes the upper end, includes an annular space 2*b* therein surrounding a core portion 2*a*, and has a cylinder shape in which the annular space 2*b* is opened on the lower end side (see FIG. 4). In the annular space 2*b*, a compression coil spring 11 is provided such that the upper end of the spring abuts on the inner rear of the annular space 2*b* and the lower end of the spring abuts on the bottom plate 8*c* of the cap 8, so that the compression coil spring 11 is stored to apply a constant urging force upward with respect to the float F.

Figure 9:
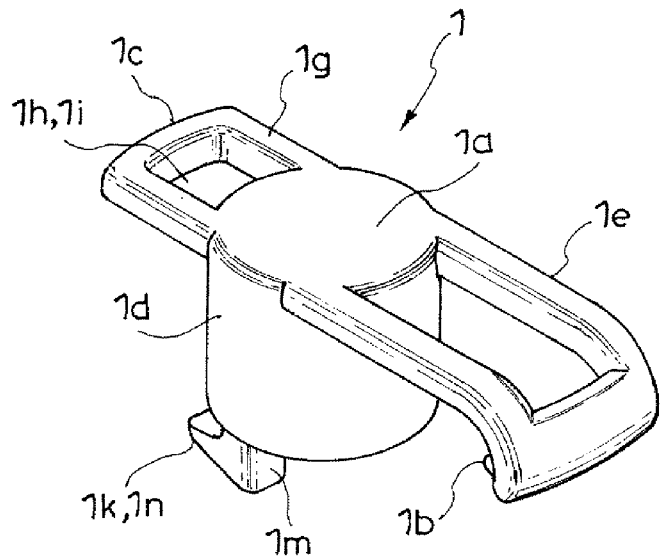
FIG. 9 is a perspective view of a valve body included in the valve device.

The valve body 1 includes a seal portion 1*a* which closes the valve opening 5*a* when the float F rises, an engaging portion 1*b* which serves as a linkage portion for linking the valve body 1 to the float body 2 to be obliquely move, and an abutting portion 1*c* which abuts on the vicinity of the valve opening 5*a* at the time of obliquely moving (see FIG. 9). In addition, the abutting portion 1*c* is configured to have an area in the horizontal direction smaller than that of the seal portion 1*a* and to laterally protrude from the seal portion 1*a*.

In the example of the drawing, the valve body 1 is provided with a main body 1*d* forming a short cylinder shape in which the upper end is closed and the lower end is opened, and first and second arm portions 1*e* and 1*g* which are provided in the upper end of the main body 1*d* and laterally protrude from the side portion of the main body 1*d*.

The main body 1*d* has an outer diameter slightly larger than the valve opening 5*a*, and the upper end of the main body 1*d* functions as the seal portion 1*a*.

The second arm portion 1*g* laterally protrudes from the side portion of the main body 1*d* on a side opposite to the first arm portion 1*e*. The second arm portion 1*g* functions as the abutting portion 1*c*. The second arm portion 1*g* has an external shape similar to a virtual rectangular shape having an area in the horizontal direction smaller than that of the seal portion 1*a* in a plan view, and has a frame shape provided with a through hole 1*i* serving as a ventilation portion 1*h* therein. In other words, in this embodiment, as illustrated in FIG. 9, the valve body 1 includes the seal portion 1*a* which closes the valve opening 5*a* formed in the case H when the float F rises, the engaging portion 1*b* which serves as the linkage portion with respect to the float body 2, and the abutting portion 1*c* which is provided on a side opposite to the engaging portion 1*b* serving as the linkage portion interposing the seal portion 1*a* and abutting on the vicinity of the valve opening 5*a* when obliquely moving. The valve body has a length from the engaging portion 1*b* serving as the linkage portion as one end and the abutting portion 1*c* as the other end. In addition, a width of the seal portion 1*a* is larger than that of the valve opening 5*a*, and a width of the abutting portion 1*c* is smaller than that of the seal portion 1*a*.

The first arm portion 1*e* has a protruding dimension from the main body 1*d* larger than the second arm portion 1*g*. The first arm portion 1*e* is slightly bent while the projection end faces downward, includes a projection 1*f* which protrudes toward the main body 1*d* at the projection end (see FIG. 10), and is provided with the engaging portion 1*b* of a hook shape on the projection end side. In the example of the drawing, a portion between the base portion of the first arm portion 1*e* and the projection end is opened, and the first arm portion 1*e* is formed in a frame shape.

An upper recess 2*c* is formed in the upper end of the float body 2 to contain the valve body 1. The upper recess 2*c* is provided with a center portion 2*d* of a circular hole shape which contains the main body 1*d* of the valve body 1, a first groove 2*e* which contains the first arm portion 1*e*, and a second groove 2*f* which contains the second arm portion 1*g* (see FIG. 7). The first groove 2*e* is opened in the side portion of the float body 2. A groove end on a side opposite to a groove end on the communication side with respect to the center portion 2*d* in the second groove 2*f* is not opened in the side portion of the float body 2.

In the center portion 2*d*, there is formed a pillar portion 2*g* which protrudes upward from the bottom of the center portion 2*d*. In addition, an island-shaped projection 2*h* is formed on the open side in the first groove 2*e*. In addition, there is formed an engagement hole 2*i* below the first groove 2*e* to be opened in the side portion of the float body 2 and to face the center of the float body 2 (see FIG. 5).

In the example of the drawing, the valve body 1 contains the pillar portion 2*g* inside the main body 1*d* so as to be supported in an obliquely movable manner on the pillar portion 2*g*. With this configuration, according to this embodiment, there is formed a recess 1*j* in the lower portion of the seal portion 1*a*, which contains a projection 2*j* formed in the upper portion of the float body 2 (see FIG. 10). Except the time of opening, the valve body 1 is stably supported in a state where the seal portion 1a is horizontally set on the float body 2.

Figure 6:
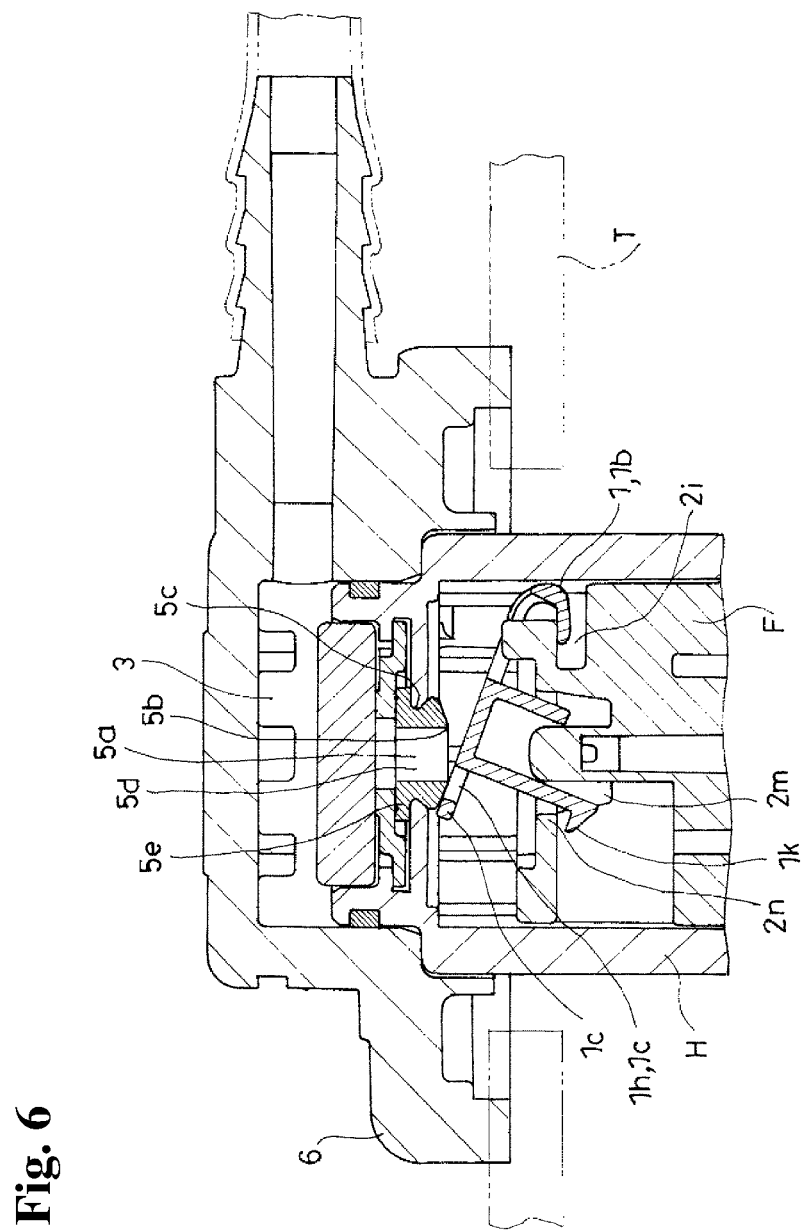
FIG. 6 is a cross-sectional view illustrating main parts of the valve device in a state immediately after a float falls down to open the valve from the state of FIG. 5.
Figure 7:
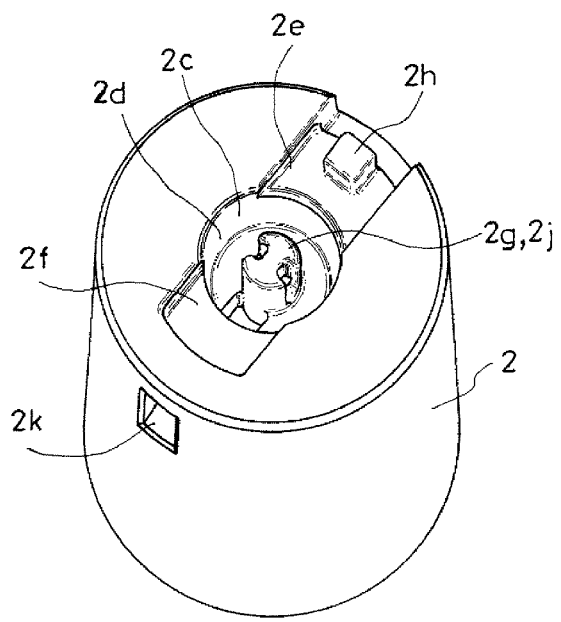
FIG. 7 is a perspective view of a float body of the valve device.
Figure 8:
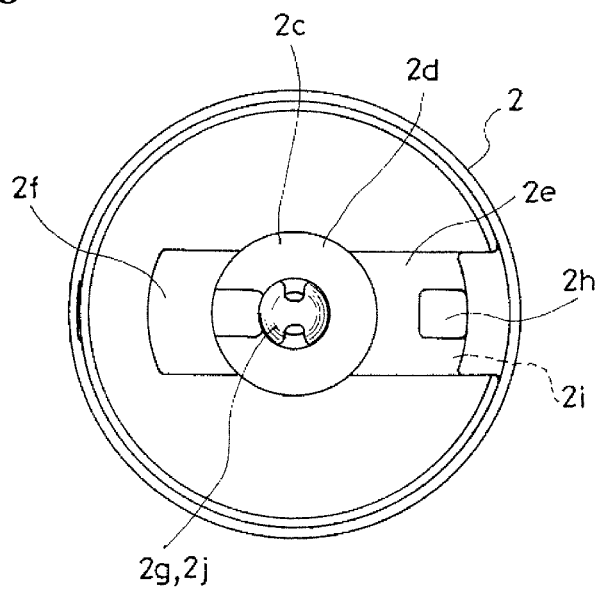
FIG. 8 is a plan view of the float body.

In addition, the valve body 1 is engaged with the float body 2 in the obliquely movable state by inserting the engaging portion 1b of the first arm portion 1e into the engagement hole 2i of the float body 2 (see FIG. 6). The island-shaped projection 2h is contained inside the first arm portion 1e in the first groove 2e.

The valve opening 5a is closed by the wide seal portion 1a of the valve body 1 of the float F which is raised when the fuel flows into the case, and the inflow of the fuel to the upper chamber 3 is inhibited. When the fuel flows out of the case, the float F is able to fall down, but the float F and the valve body 1 are linked in the engaging portion 1b while not linked in the abutting portion 1c. Therefore, the valve body 1 causes the abutting portion 1c to abut on the vicinity of the valve opening 5a so that the engaging portion 1b obliquely moves down about the contact place, and separates the seal portion 1a from the valve opening 5a (see FIG. 6). With this configuration, even in a case where the tank is highly pressured, the valve can be smoothly opened. While the abutting portion 1c moves toward the center of the valve opening 5a as the float F falls down, the area of the abutting portion 1c in the horizontal direction becomes smaller than that of the seal portion 1a in the horizontal direction, the width of the seal portion 1a becomes larger than that of the valve opening 5a, and the width of the abutting portion 1c becomes smaller than that of the seal portion 1a. Therefore, it is not possible for the abutting portion 1c to hinder the flow of gas as much as possible, which is generated at the same time when the valve is opened, in the tank passing through the valve opening 5a. In other words, the valve device according to this embodiment can response well to a request for a large amount of gas outflow from the tank to the outside at the same time when the valve is opened.

In particular, according to this embodiment, since the abutting portion 1c is provided with the through hole 1i serving as the ventilation portion 1h (see FIG. 9), the abutting portion 1c is formed such that the air flow at the same time when the valve is opened is not hindered still more.

In addition, according to this embodiment, the valve body 1 is provided with a regulating portion 1k which is hooked on a part of the float body 2 at a predetermined position of oblique movement of the valve body 1 to inhibit the oblique movement or more.

Figure 10:
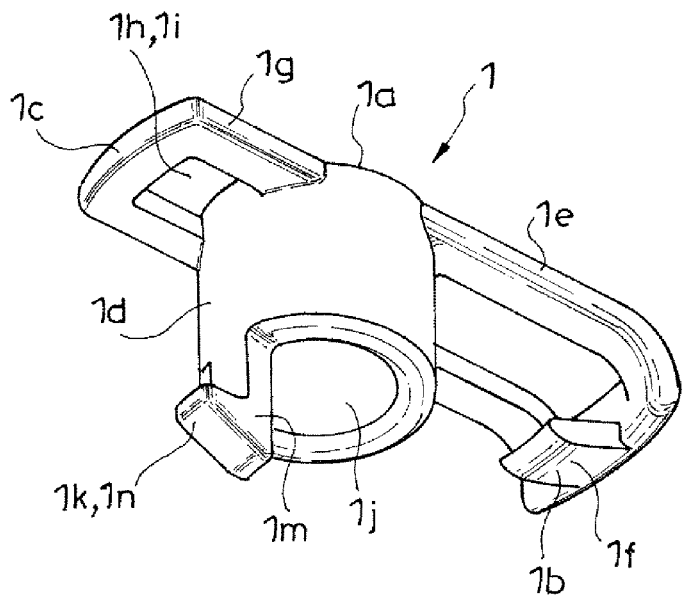
FIG. 10 is a perspective view of the valve body included in the valve device, illustrating the valve body when viewed from the lower side of FIG. 9.

In the example of the drawing, a leg portion 1m provided with a claw portion 1n protruding outward is integrally formed in the leg end at a position immediately below the abutting portion 1c (the lower end in the main body 1d of the valve body 1) (see FIG. 10). On the other hand, the side portion of the float body 2 is opened to form a side recess 2k immediately below the second groove 2f to be continuous toward the center of the float body 2 (see FIG. 7). The side recess 2k and the upper recess 2c communicate with each other between the pillar portion 2g and the second groove 2f through a notch portion 2m formed by notching the bottom wall of the center portion 2d and a part of the side wall (see FIG. 4). Then, the valve body 1 is supported by the upper portion of the float body 2 as described above in a state where the leg portion 1m is inserted into the side recess 2k through the notch portion 2m. In addition, in a case where the valve body 1 is more obliquely disposed from the state illustrated in FIG. 6, the claw portion 1n of the leg portion 1m comes to be hooked on an upper end 2n of the notch portion 2m. According to this embodiment, the oblique movement of the valve body 1 falls within a constant range. Further, an unexpected dropout from the float body 2 of the valve body 1 is inhibited.

Figure 11:
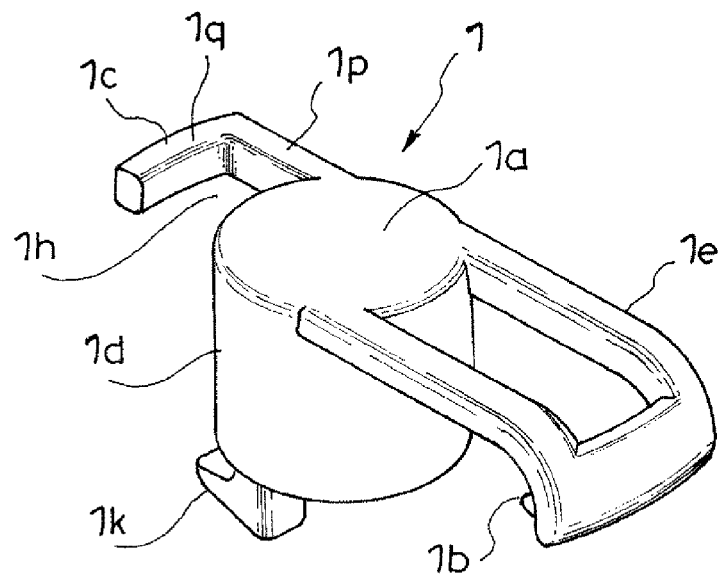
FIG. 11 is a perspective view illustrating a modification example in which the structure of the valve body is partially changed.
Figure 12:
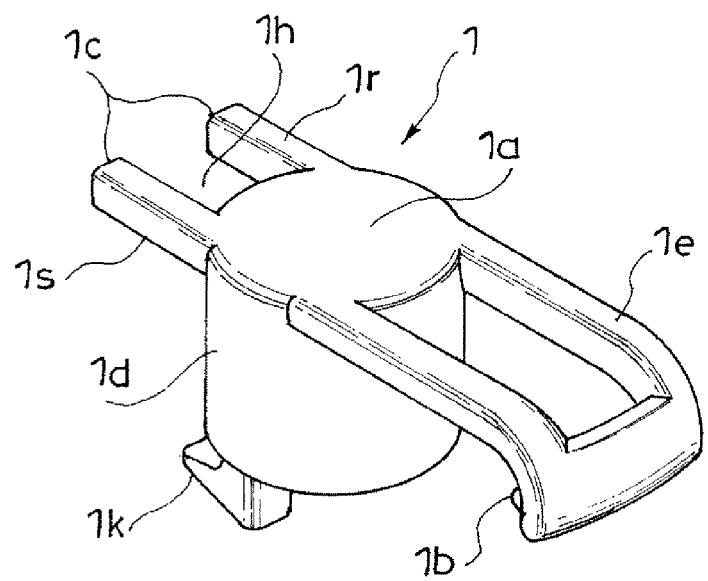
FIG. 12 is a perspective view illustrating a modification example in which the structure of the valve body is partially changed.
Figure 13:
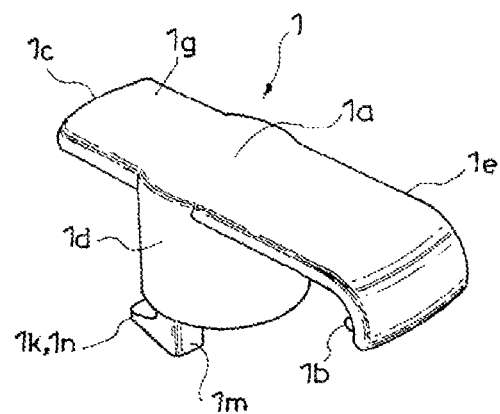
FIG. 13 is a perspective view illustrating a modification example in which the structure of the valve body is partially changed.
Figure 14:
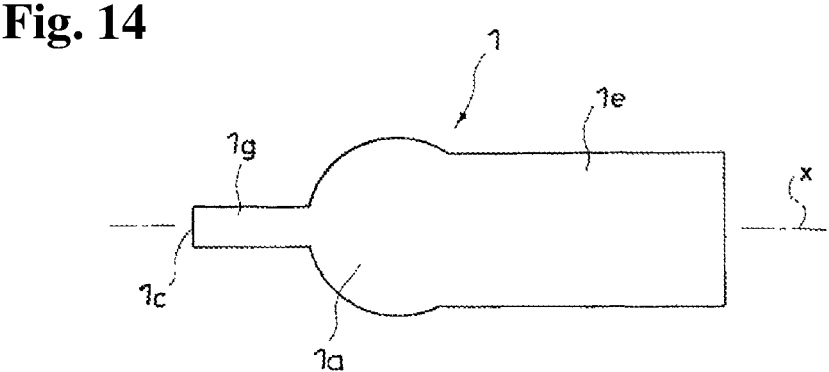
FIG. 14 is a plan view illustrating a modification example in which the structure of the valve body is partially changed.
Figure 15:
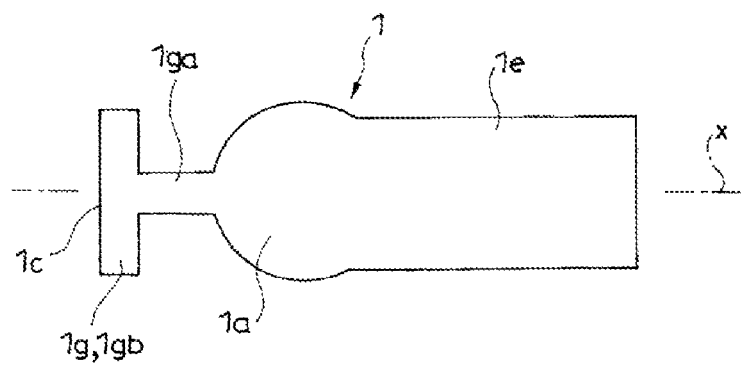
FIG. 15 is a plan view illustrating a modification example in which the structure of the valve body is partially changed.

The abutting portion 1c has an area in the horizontal direction smaller than that of the seal portion 1a, and more preferably as wide as the ventilation portion 1h is provided. The specific shape may be changed as needed. FIG. 11 illustrates an example in which the abutting portion 1c is formed by a first rod-shaped portion 1p laterally protruding from the main body 1d and a second rod-shaped portion 1q extending in a direction intersecting with the first rod-shaped portion 1p from the protruding end of the first rod-shaped portion 1p. In the example of FIG. 11, the ventilation portion 1h is disposed between the second rod-shaped portion 1q and the main body 1d. In addition, FIG. 12 illustrates an example in which the abutting portion 1c is formed by a first rod-shaped portion 1r laterally protruding from the main body 1d and a second rod-shaped portion 1s laterally protruding from the main body 1d parallel to the first rod-shaped portion 1r. In the example of FIG. 12, the ventilation portion 1h is disposed between the first rod-shaped portion 1r and the second rod-shaped portion 1s. In the example illustrated in FIG. 13, the valve body 1 has a length from the engaging portion 1b serving as the linkage portion as one end to the abutting portion 1c as the other end. In addition, the width of the seal portion 1a is larger than that of the valve opening 5a, and the width of the abutting portion 1c is smaller than that of the seal portion 1a. However, the ventilation portion 1h is not provided in the abutting portion 1c. In addition, there is no opening between the base portion of the first arm portion 1e and the projection end, and the first arm portion 1e is formed in a plate shape. In the example illustrated in FIG. 14, the abutting portion 1c is formed in a rod shape which passes through the center of the seal portion 1a and protrudes from the seal portion 1a along a virtual center line x in the length direction of the valve body 1. In addition, there is no opening between the base portion of the first arm portion 1e and the projection end, and the first arm portion 1e is formed in a plate shape. In the example illustrated in FIG. 15, the abutting portion 1c is formed by a longitudinal rod-shaped body 1ga which passes through the center of the seal portion 1a and protrudes from the seal portion 1a along a virtual center line x in the length direction of the valve body 1, and a widthwise rod-shaped body 1gb which is integrally connected to a position in about the center in the width direction at the projection end of the longitudinal rod-shaped body. In addition, there is no opening between the base portion of the first arm portion 1e and the projection end, and the first arm portion 1e is formed in a plate shape.

Further, as a matter of course, the invention is not limited to the above-described embodiments, and contains all the embodiments through which the object of the invention is achieved. Further, all the contents of the specification, the claims, the drawings, and the abstract of Japanese Patent Application No. 2014-024393 filed on Feb. 12, 2014 are cited herein, and incorporated as a disclosure of the specification of the invention.

What is claimed is:
1. A valve device forming a part of a ventilation passage of a fuel tank, comprising:
   a float; and
   a case for storing the float,
   wherein the float includes a float body, and a valve body provided at an upper portion of the float body to incline obliquely with respect to the float body, the valve body includes
- a seal portion for closing a valve opening formed in the case when the float rises,
- a linkage portion connected to the seal portion and arranged to link with respect to the float body,
- an abutting portion connected to the seal portion and having a ventilation portion, the abutting portion abutting against an outer circumference of the valve opening when the valve body inclines obliquely with respect to the float body,
- a regulating portion connected to the seal portion, and, when the valve body inclines, being hooked on a part of the float body at a predetermined position of an oblique movement of the valve body to inhibit the oblique movement thereof,
- a first arm portion extending from the seal portion,
- a projection having said linkage portion, and
- a valve main body extending from the seal portion and including a leg portion extending from the valve main body and having a claw portion, as the regulating portion, protruding outwardly and integrally formed in a lower end of the leg portion at a position below the abutting portion, and the float body includes
- a pillar portion,
- an upper recess surrounding the pillar portion in which the valve main body is disposed,
- a first groove formed at one side of the pillar portion for receiving the linkage portion therein,
- a second groove formed at a side opposite to the one side for receiving the abutting portion therein,
- a side recess located under the second groove, and
- a notch portion connecting the upper recess and the side recess into which the leg portion is disposed.

\* \* \* \* \*